United States Patent [19]
Suzuki et al.

[11] Patent Number: 5,302,647
[45] Date of Patent: Apr. 12, 1994

[54] FLAME RESISTANT RESIN COMPOSITION

[75] Inventors: Masanori Suzuki; Hiroyuki Itoh; Masaaki Mawatari; Tateki Furuyama, all of Yokkaichi mie, Japan

[73] Assignee: DSM N.V., Netherlands

[21] Appl. No.: 728,223

[22] Filed: Jul. 12, 1991

[51] Int. Cl.$^5$ .................. C08K 5/523; C08K 3/32; C08K 3/28

[52] U.S. Cl. .................. 524/141; 524/142; 524/143; 524/144; 524/145; 524/416; 524/417; 524/100

[58] Field of Search ............. 524/141, 142, 143, 144, 524/145, 575, 100; 523/436, 451; 525/65, 67, 68, 118, 134, 79, 298, 299; 526/313

[56] References Cited

U.S. PATENT DOCUMENTS

| | | |
|---|---|---|
| 3,639,506 | 2/1972 | Haaf .................. 524/144 |
| 3,879,345 | 4/1975 | Furukawa et al. .................. 524/141 |
| 3,966,677 | 6/1976 | Sonoyama et al. .................. 524/143 |
| 3,970,534 | 7/1976 | Fujiwara et al. .................. 525/298 |
| 4,182,803 | 1/1980 | Kanagawa et al. .................. 526/313 |
| 4,459,381 | 7/1984 | Trivedi .................. 524/144 |
| 4,692,488 | 9/1987 | Kress et al. .................. 524/141 |

FOREIGN PATENT DOCUMENTS

| | | |
|---|---|---|
| 189668 | 8/1986 | European Pat. Off. . |
| 50-13484 | 2/1975 | Japan . |
| 52-6791 | 1/1977 | Japan . |

*Primary Examiner*—Veronica P. Hoke
*Attorney, Agent, or Firm*—Cushman, Darby & Cushman

[57] ABSTRACT

A flame retardant resin composition which includes the following component (A) and component (B) blended in the ratio (A):(B)=100:1-40 parts by weight. Component (A) is a thermoplastic resin including 0-70% by weight of a rubber component and 100-30% by weight of a polymer component formed from monomers comprising a methylated aromatic vinyl monomer and an hydroxylated aromatic vinyl monomer and, optionally, an aromatic vinyl monomer other than the above monomers, a cyanated vinyl monomer, a (meth)acrylic acid ester monomer, maleic anhydride, and a maleimide monomer; graft ratio of the thermoplastic resin being 10-150% when the rubber component is used. Component (B) is a flame retarder.

8 Claims, No Drawings

FLAME RESISTANT RESIN COMPOSITION

DETAILED DESCRIPTION OF THE INVENTION

A. Field of the Invention

The present invention relates to a flame retardant resin composition with superior impact resistance and self-fire-extinguishing characteristics.

B. Prior Art

Conventionally, thermoplastic resins which provide impact resistance by means of a rubber-like polymer are commonly known under the general term of ABS resins. However, flame retardant characteristics are necessary depending on the application. This particularly applies to the case where these resins are used as a material for household products, electrical appliances, OA equipment, automobiles, and the like, and as construction materials.

Commonly known methods of imparting flame retardant characteristics to rubber-reinforced thermoplastic resins, including ABS resins, involve blending a flame retarder into the composition, but in many cases this type of flame retarder contains a halogen-containing compound such as brominated diphenyl oxide or brominated polycarbonate. These flame retarders when blended together with antimony trioxide provide a superior flame retarding effect.

However, when these halogen-containing compounds are added into a resin composition, toxic materials are generated during the molding process and during combustion. A major problem also arises that dioxins and furans, which are deadly poisons to humans, are created from these compounds.

As a method of eliminating these drawbacks, proposals have been made that, in place of halogen-containing compounds, compounds containing phosphorus and/or nitrogen and the like be added to rubber-reinforced thermoplastic resins, including ABS resins. However, these compounds are inferior to the halogen-containing compounds from the aspect of flame retardance. Especially, the flame retardance effect is low with respect to styrene rubber-reinforced thermoplastic resins, including ABS resins, and when this type of resin is used, large volumes of the compounds containing phosphorus and/or nitrogen and the like must be added. In such a case, the physical characteristics, such as impact resistance of this resin composition are largely lost. This presents a major problem.

PROBLEMS TO BE SOLVED BY THE INVENTION

Accordingly, an object of the present invention is to provide, (1) a flame retardant resin composition by which is achieved a high flame-retardance level with a low halogen content ratio, and in which the creation of toxic materials such as dioxins and furans is reduced; or (2) a flame retardant resin composition with superior impact resistance in which, even when a halogen-containing flame retardant is not used, a high flame-retardance level can also be achieved by means of a phosphorus flame retardant; by the introduction of a ring-substituted methylstyrene and a ring-substituted hydroxystyrene to a rubber-reinforced thermoplastic resin.

MEANS FOR THE SOLUTION OF THE PROBLEMS

This object is achieved in the present invention by the provision of a flame retardant resin composition comprising the following component (A) and component (B) blended in the ratio (A):(B)=100:1–40 parts by weight;

Component (A): a thermoplastic resin comprising 0–70% by weight of a rubber component and 100–30% by weight of a polymer component formed from monomers selected from the group consisting of a methylated aromatic vinyl monomer, a hydroxylated aromatic vinyl monomer and, optionally, an aromatic vinyl monomer other than the above monomers, a cyanated vinyl monomer, a (meth)acrylic acid ester monomer, maleic anhydride, and a maleimide monomer; graft ratio of thermoplastic resin being 10–150% when the rubber component is used; and Component (B): a flame retarder; and a flame retardant resin composition comprising 5–95% by weight of the flame retardant resin composition of claim 1 and 95–5% by weight of other resin materials.

The present invention will now be explained in detail.

Examples which can be given of the rubber component used in component (A) of the present invention include polybutadiene, butadiene-styrene copolymers, polyisoprene, butadiene-acrylonitrile copolymers, ethylene-propylene (diene methylene) copolymers, isobutylene-isoprene copolymers, acrylic rubber, styrene-butadiene block copolymers, styrene-butadiene-styrene block copolymers, styrene-butadiene-styrene radial teleblock copolymers, styrene-isoprene-styrene block copolymers, hydrogenated diene-type (block) copolymers such as SEBS and the like, polychloroprene, polyurethane rubber, silicone rubber, and the like. Among these, preferable are polybutadiene, butadiene-styrene copolymers, ethylene-propylene (diene methylene) copolymers, silicone rubber, and hydrogenated diene-type (block) copolymers.

Examples of methylated aromatic vinyl monomers include o-methylstyrene, p-methylstyrene, and m-methylstyrene, and mixtures of two or more of these; dimethylstyrene, trimethylstyrene, tetramethylstyrene, pentamethylstyrene, and the like. Examples of methylated aromatic vinyl monomers also include derivatives with a methyl group bonded to the $\alpha$-position. Among these, preferable are o-methylstyrene, p-methylstyrene, and m-methylstyrene, and mixtures of two or more of these.

Examples of hydroxylated aromatic vinyl monomers which can be given are the compounds represented by the following structural formula (I).

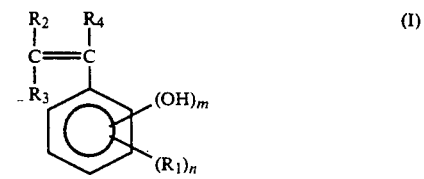

(wherein $R_1$ to $R_4$ are hydrogen atoms, alkyl groups with one to five carbon atoms, phenyl groups, halogen atoms, halogenated alkyl groups, cyclohexyl groups, or alkylphenyl groups; m is an integer from one to five; and n is an integer from one to four).

Among these, o-hydroxystyrene, p-hydroxystyrene, and m-hydroxystyrene, and mixtures of two or more of these are preferable.

Examples of aromatic vinyl monomers include styrene, α-methylstyrene, bromostyrene, dibromostyrene, tribromostyrene, chlorostyrene, dichlorostyrene, α-ethylstyrene, and the like. Among these, styrene and α-methylstyrene are preferable.

Examples of cyanated vinyl monomers include acrylonitrile, methacrylonitrile, and the like. Of these, acrylonitrile is preferable.

Examples of (meth)acrylic acid esters which can be given are methyl acrylate, ethyl acrylate, butyl acrylate, methyl methacrylate, ethyl methacrylate, butyl methacrylate, and the like, with methyl methacrylate being the most preferable.

Examples which can be given of maleimide-type monomers include maleimide, N-methyl maleimide, N-ethyl maleimide, N-propyl maleimide, N-isopropyl maleimide, N-cyclohexyl maleimide, N-phenyl maleimide, N-(p-bromophenyl) maleimide, tribromophenyl maleimide, N-(p-fluorophenyl) maleimide, and the like. Among these, the preferable examples are maleimide, N-phenyl maleimide, N-cyclohexyl maleimide, tribromophenyl maleimide, and the like.

Component (A) of the present invention is a thermoplastic resin comprising 100-70% by weight of a rubber component and 100-30% by weight of a polymer component formed from monomers selected from the group consisting of a methylated aromatic vinyl monomer, a hydroxylated aromatic vinyl monomer and, optionally, an aromatic vinyl monomer other than the above monomers, a cyanated vinyl monomer, a (meth)acrylic acid ester monomer, maleic anhydride, and a maleimide monomer; and of which the graft ratio is 10-150% when the rubber component is used.

The amount of the rubber component contained in component (A) is 0-70% by weight, and preferably 0-60% by weight. In order to obtain the effect of the addition from the rubber component, 5-70% by weight is preferably used, and more preferably, 10-60% by weight. If a 70% by weight content is exceeded, the surface gloss and the flame retardance of the products molded from the composition of present invention are reduced.

The graft ratio of component (A), when the rubber component is used as an essential component, is 10-150% by weight and preferably 20-120% by weight. If the graft ratio is less than 10% by weight, the effect of the addition of the rubber component is not adequately demonstrated. For example, an adequate impact resistance is not obtained. On the other hand, if 150% by weight is exceeded there is an undesirable tendency for dripping due to melting to occur during flame retardation.

In component (A), the amount of the polymer component formed from monomers selected from the group consisting of a methylated aromatic vinyl monomer, a hydroxylated aromatic vinyl monomer and, optionally, an aromatic vinyl monomer other than the above monomers, a cyanated vinyl monomer, a (meth)acrylic acid ester monomer, maleic anhydride, and a maleimide monomer is 30-100% by weight, and preferably 40-100% by weight. In the case where the rubber component is used, the preferable content is 30-95% by weight, and more preferably 40-90% by weight. If the content of the polymer component is less than 30% by weight, the surface gloss and the flame retardance of the products formed from the composition of the present invention are reduced.

The amount of the methylated aromatic vinyl monomer contained in component (A) is preferably 1-99% by weight, more preferably 5-90% by weight, and particularly preferably 10-60% by weight. If the amount of the methylated aromatic vinyl monomer contained in component (A) is less than 1% by weight, the flame retardance decreases; if over 99% by weight, the flame retardance deteriorates.

The amount of the hydroxylated aromatic vinyl monomers contained in component (A) is preferably 1-99% by weight, more preferably 5-85% by weight, and most preferably 10-75% by weight. Ideal results will be obtained from the amount of the hydroxylated aromatic vinyl monomers contained in component (A) of 10-50% by weight. If the amount less than 1% by weight, adequate flame retardance is not obtained; if over 99% by weight, the flame retardance and heat stability of the resin deteriorates.

In this specification, the expressions "methylated aromatic vinyl" and "hydroxylated aromatic vinyl" mean, a "methylated aromatic vinyl" or a "hydroxylated aromatic vinyl" contained as a monomer component of a homopolymer, as a monomer component in a copolymer, or as a graft polymer component in a rubber-like polymer in component (A).

The limiting viscosity $[\eta]$ of the matrix resin of component (A) is preferably 0.1-1.5 dl/gm (this and subsequent values are measured at 30° C. in methyl ethyl ketone), and more preferably 0.3-1.0 dl/gm. If $[\eta]$ is less than 0.1 dl/gm, the impact strength is inadequate; if greater than 1.5 dl/gm, the moldability of the composition diminishes. The matrix resin is here defined as the resin component in component (A) other than the grafted rubber component. The limiting viscosity $[\eta]$ is the value obtained by measuring the fraction of component (A) soluble in methyl ethyl ketone by the usual method.

Processes for preparing component (A) in which a rubber component is essential include, for example, (1) a method whereby a polymer component is polymerized in the presence of a rubber component to obtain a rubber-reinforced thermoplastic resin; (2) a graft-blend method whereby a portion of a polymer component is polymerized in the presence of a rubber component, the remainder of the polymer component being polymerized separately, and the two polymers blended; (3) a method whereby a methylated aromatic vinyl monomer and/or a hydroxylated aromatic vinyl monomer, or the above-mentioned optional monomers, are separately copolymerized, as required, and are blended with the polymers obtained from the method (1) or the method (2); and the like.

Processes for preparing component (A) in which a rubber component is not contained include, for example, (4) the method as (1) or (2) above, but omitting the incorporation of the rubber component; (5) a method whereby the material obtained in method (4) is used in method (3), in place of the material obtained in the methods (1) or (2).

An examples of a typical material for component (A) is a rubber-reinforced thermoplastic resin in which ABS resin, p-methylstyrene-styrene-acrylonitrile copolymer, and p-hydroxystyrene polymer are blended. The composition of each of these components is preferably in the 5-50% by weight, 5-45% by weight, and 5-30% by weight range respectively.

Examples of polymerization methods for component (A) of the flame retardant resin composition of the present invention which can be given include the block polymerization method, the solution polymerization method, the suspension polymerization method, the emulsion polymerization method, and the precipitation polymerization method. These methods can also be used in combination.

Any material commonly used to impart flame retardance to a resin material can be used as component (B) which is a flame retarder of the present invention. Among these, compounds containing bromine, chlorine, phosphorus and/or nitrogen are preferable. From the aspect of not producing toxic gases such as dioxin and the like, phosphorus and/or nitrogen containing compounds are preferable, in particular, types of phosphates, typified by triphenyl phosphate, ammonium polyphosphate, red phosphorus, melamine, and the like.

The amount of component (B) contained in the flame retardant resin composition of the present invention is 1–40% by weight for 100% by weight of component (A), and is preferably 5–35% by weight, and even more preferably 5–30% by weight. If the amount of component (B) is less than 1% by weight the flame retardance is low; if greater than 40% by weight the impact resistance is low and bleed-out of the flame retarder occurs.

As the other resin materials which can be used in the invention of claim 2, one or more types of polymers selected from ABS resin, AES resin, MBS resin, HIPS, polystyrene, MS resin, polycarbonate, polyamide, PBT, PET, PPS, PPO, POM, polyacetal, polyether-esteramide, polyetherimide, polyimide, PEEK, polyacrylate, polymethyl-methacrylate, silicone resin, polyvinyl chloride, chlorine-containing polymers, fluorine-containing polymers, epoxy resins, phenyl resins, polyurethane, (unsaturated) polyester, and thermoplastic elastomers can be used. Of these, one or more types of polymers selected from polycarbonate, polyamide, PBT, PET, PPS, PPO, and silicone resin are preferable.

Because of the incorporation of methylated aromatic vinyl compounds and hydroxylated aromatic vinyl compounds in component (A), the flame retardant resin composition of the present invention can not only reduce the amount of halogen-containing flame retarder as compared with conventional compositions, but also achieve superior flame retardance by means of a phosphorus-containing flame retarder, without using a halogen-containing flame retarder.

Specifically, methyl groups which are combined in an aromatic ring achieve resonance stabilization when heated, and become benzyl radicals. This benzyl radical is then recombined to form a cross-linked structure. This cross-linked polymer not only prevents drip during combustion of the resin, but also restrains combustion of the resin, because of its incombustible carbonized structure. On the other hand, hydroxy groups combined in an aromatic ring are released by dehydration in the presence of a strong acid such as polyphosphoric acid during combustion, thereby promoting the formation of an incombustible carbonized structure. Synergistic effects of these operations provides the effect intended in the present invention.

As a device for melting and mixing the various components used in the manufacture of the flame retardant resin composition of the present invention, commonly known equipment including an open type mixing roll, a closed type Banbury mixer, an extruder, a kneader, a continuous mixer, and the like can be used.

Additives which can optionally be mixed into the flame retardant resin composition of the present invention include antioxidants, stabilizers such as ultraviolet absorbants, lubricants such as silicone oil, low molecular weight polyethylene and the like, fillers such as calcium carbonate, talc, clay, titanium oxide, silica, magnesium carbonate, carbon black, barium sulfate, calcium oxide, aluminum oxide, mica, glass beads, glass fiber, metal fillers, and the like, dispersing agents, foaming agents, colorants, and the like.

The flame retardant resin composition of the present invention can be formed into products by extrusion, injection molding, compression, and the like. The products formed are superior in flame retardance, impact resistance, and formability in practice. Also, because they have a good external appearance, they are extremely useful in household products, electrical appliances, OA equipment, automobiles, and the like, and as construction materials.

EXAMPLES

The present invention will be described in more detail by way of examples, which are given for illustration of the invention and are not intended to be limiting thereof.

The following polymers were used as component (A).

Graft copolymer (a-1)

Into a separable flask equipped with a reflux condenser, a thermometer, and a stirrer, 40 parts of polybutadiene rubber latex (as solid), 65 parts of ion exchanged water, 0.35 parts of rosin oxide soap, 15 parts of styrene, and 5 parts of acrylonitrile were charged as initial components. A solution of 0.2 part of sodium pyrophosphate, 0.01 part of $FeSO_4.7H_2O$, and 0.4 part of fructose dissolved in 20 parts of ion exchanged water was added to the above mixture. Then, 0.07 part of cumene hydroperoxide were added to initiate the polymerization. After one hour of polymerization, 45 parts of ion exchanged water, 0.7 part of rosin oxide soap, 30 part of styrene, 10 part of acrylonitrile, and 0.01 part of cumene hydroperoxide were added as increment components over a period of two hours with continuous stirring, followed by an additional one hour polymerization to complete the reaction.

The copolymer latex obtained in this manner was coagulated by the addition of sulfuric acid, washed with water, and dried, to obtain a graft copolymer (a-1).

Graft copolymer (a-2)

A graft copolymer (a-2) was obtained by the polymerization in the same manner as the graft copolymer (a-1), except that monomers listed shown in Table 1 were used.

TABLE 1

| Formulation of Graft Copolymer (Initial Component/Incremental Component) | | |
|---|---|---|
| | (a-1) | (a-2) |
| Polybutadiene | 40/0 | 16/0 |
| Styrene | 15/30 | 5/13 |
| Acrylonitrile | 5/10 | 5/11 |
| p-Methylstyrene | | 9/21 |
| p-Hydroxystyrene | | 6/14 |

Copolymer (b-1)

Into a separable flask equipped with a reflux condenser, a thermometer, and a stirrer, 250 parts of ion exchanged water, 3.0 parts of potassium rhodinate, 75 parts of p-methylstyrene, 25 parts of acrylonitrile and 0.1 part of t-dodecylmercaptan were charged. A solution of 0.05 part of sodium ethylenediamine tetraacetate, 0.002 part of $FeSO_4.7H_2O$, and 0.1 part of sodium formaldehyde sulfoxylate dissolved in 8 parts of ion exchanged water was added to the above mixture. Then, 0.01 part of diisopropylbenzene hydroperoxide was added to initiate the polymerization. After about one hour of polymerization the reaction was terminated.

The copolymer latex obtained in this manner was coagulated by the addition of sulfuric acid, washed with water, and dried, to obtain a copolymer (b-1).

Copolymer (b-2)

A copolymer (b-2) was obtained following the same method outlined under the copolymer (b-1), except that styrene was used in place of p-methylstyrene.

Copolymer (c-1)

Marukalinker M, a p-hydroxystyrene homopolymer manufactured by Maruzen Petrochemical Co., Ltd., was used. Examples 1-4, Comparative Examples 1-2

The components listed in Table 2 were blended in the percentages shown, then were mixed in a Henschel-type mixer, followed by kneading in the molten state at 220° C. with a bend-equipped extruder, and pelletized to provide a pelletized flame retardant resin compositions.

Test leaves were prepared by forming the resulting flame retardant resin compositions in an injection molder with the cylinder temperature set at 230° C. The results of evaluations of the resulting flame retardant resin compositions are given in Table 2.

The physical characteristics of the resulting flame retardant resin compositions were evaluated by the following methods.

(1) Flame retardance
 a. O.I.(Oxygen Index):
   Test leaf dimensions: $\frac{1}{8}'' \times \frac{1}{2}'' \times 5''$
 b. Combustibility test conforming to UL-94:
   Test leaf dimensions: $1/16'' \times \frac{1}{2}'' \times 5''$
(2) Izod impact value:
ASTM D256 $\frac{1}{4}''$, 23° C., notched (kg·cm/cm)

TABLE 2

| | Examples | | | | Comparative Examples | |
|---|---|---|---|---|---|---|
| | 1 | 2 | 3 | 4 | 1 | 2 |
| Polymer Composition of Component (A) (%) | | | | | | |
| a-1 | 40 | 50 | — | — | 40 | 40 |
| a-2 | — | — | 100 | — | — | — |
| b-1 | 40 | 33 | — | 40 | — | 40 |
| b-2 | — | — | — | 40 | 40 | 20 |
| c-1 | 20 | 17 | — | 20 | 20 | — |
| Amount of Rubber in Component (A) (%) | 16 | 20 | 16 | 0 | 16 | 16 |
| Amount of p-Methylstyrene in Component (A) (%) | 30 | 25 | 30 | 30 | 0 | 30 |
| Amount of p-Hydroxystyrene in Component (A) (%) | 20 | 17 | 20 | 20 | 20 | 0 |
| Graft Ratio of Component (A) (%)* | 50 | 50 | 45 | 0 | 50 | 50 |
| Formulation of Flame Retardant Resin Composition (part by weight) | | | | | | |
| Component (A) | 100 | 52 | 100 | 100 | 100 | 100 |
| Component (B) (Triphenylphosphate) | 15 | 13 | 15 | 15 | 15 | 15 |
| Polycarbonate Resin | — | 35 | — | — | — | — |
| Evaluation Results of Flame Retardant Resin Composition | | | | | | |
| Flame Retardance | | | | | | |
| O.I. ($\frac{1}{8}''$) (%) | 39 | 38 | 37 | 41 | 23 | 24 |
| UL-90 (1/16'') (%) | V-O | V-O | V-O | V-O | ** | ** |
| Izot Impact Strength | 15 | 25 | 16 | 3 | 13 | 14 |

*Graft ratio (%) = $\frac{y - x}{x} \times 100$
x: weight of rubber component in 1 gm of Component (A)
y: weight of undissolved components methyl ethyl ketone in 1 gm of component (A)
**Burning As can be clearly understood from the results given in Table 2, the compositions of Examples 1-4, which are the flame retardant resin composition of the present invention, achieve the object of the present invention. The compositions of the Comparative Examples 1 and 2 are flame retardant resin compositions in which the amounts of combined p-methylstyrene and combined hydroxystyrene fall below the limits of the flame retardant resin composition of the present invention, so that they do not achieve the flame retardance object of the present invention.

The flame retardant resin composition of the present invention has superior flame retardance with a low halogen content or without using a halogen-containing flame retardant, and, in addition, the creation of toxic materials such as dioxins scarcely during the forming process and during combustion. The flame retardant resin composition of the present invention also has a high use level relative to impact resistance.

Accordingly, with the flame retardant resin composition of the present invention it is possible to produce large-size formed products for office equipment and electrical appliances for OA applications. These materials are superior in practical application, and are extremely useful as production materials, having an exceptionally high industrial value.

What is claimed is:

1. A flame retardant thermoplastic resin composition comprising:
   a) a thermoplastic polymer component comprising ring substituted methylstyrene and hydroxylated aromatic vinyl monomers;
   b) a halogen-free flame retarder comprising at least one compound selected from the group consisting of a phosphorus-containing flame retarder and a nitrogen-containing flame retarder
   wherein components a) and b) are blended in the ratio of 100:1-40 parts by weight, respectively.

2. The flame retardant thermoplastic resin composition of claim 1 wherein said thermoplastic polymer component further comprises a third monomer selected from the group consisting of non-methylated aromatic vinyl monomers, non-hydroxylated aromatic vinyl monomers, (meth)acrylic acid ester monomers, maleic anhydride monomers, and maleimide type monomers.

3. A flame retardant composition comprising 5-95% by weight of said flame retardant resin composition of claim 1 and 5-95% by weight of other resin materials.

4. A flame retardant composition comprising 5-95% by weight of said flame retardant resin composition of claim 2 and 5-95% by weight of other resin materials.

5. A flame retardant composition comprising:
 a) a thermoplastic graft copolymer comprising 5-70 wt % of a rubber component as the graft substrate and 30-95 wt % of a thermoplastic polymer comprising methylated aromatic vinyl monomers and hydroxylated aromatic vinyl monomers; and
 b) a flame retarder wherein components a) and b) are blended in the ratio of 100:1-40, respectively, and the graft ratio of the thermoplastic graft copolymer is 10-150%.

6. The flame retardant composition of claim 5 wherein said thermoplastic polymer further comprises a third monomer selected from the group consisting of non-methylated aromatic vinyl monomers, non-hydroxylated aromatic vinyl monomers, (meth)acrylic acid ester monomers, maleic anhydride monomers, and maleimide type monomers.

7. A flame retardant composition comprising 5-95% by weight of said flame retardant resin composition of claim 5 and 5-95% by weight of other resin materials.

8. A flame retardant composition comprising 5-95% by weight of said flame retardant resin composition of claim 6 and 5-95% by weight of other resin materials.

* * * * *